Oct. 13, 1970   H. R. VAN DERZEE   3,533,867
METHODS FOR REDUCING ELECTRICAL LOSSES IN AND BONDING
OF ELECTRICAL INDUCTIVE LAMINATED STRUCTURES
Filed Jan. 13, 1967   3 Sheets-Sheet 1
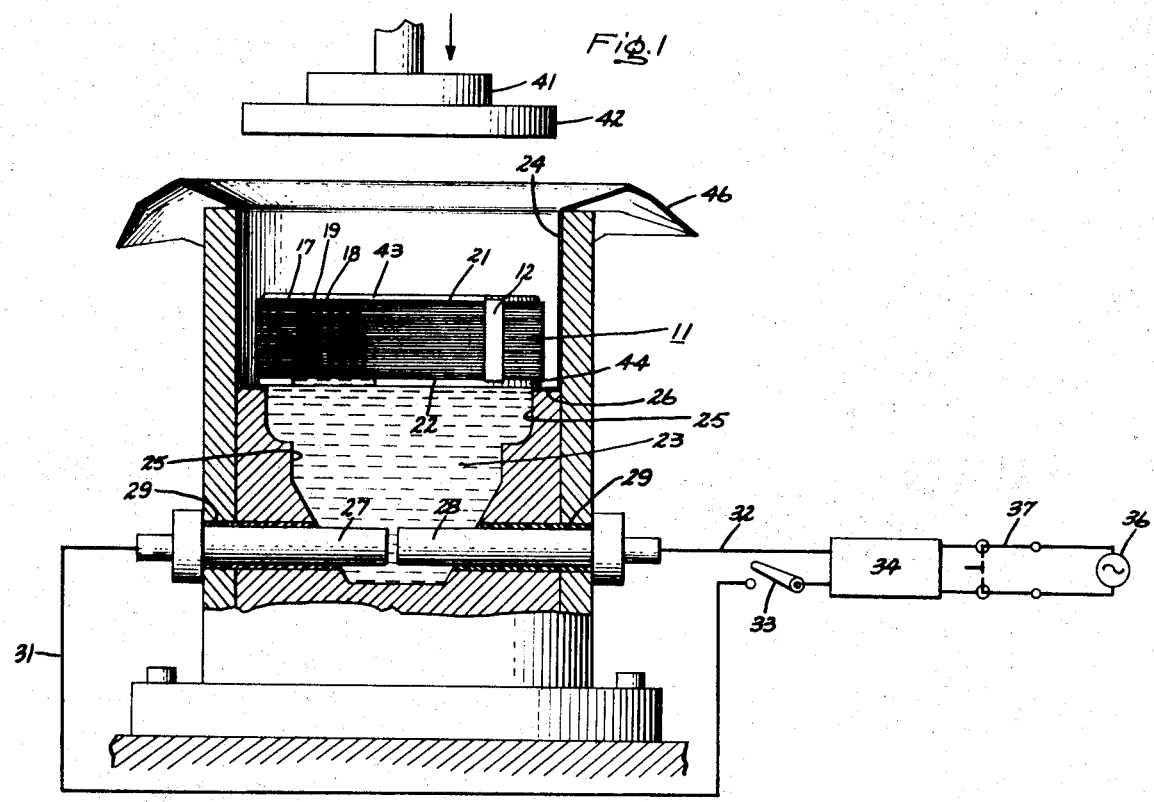
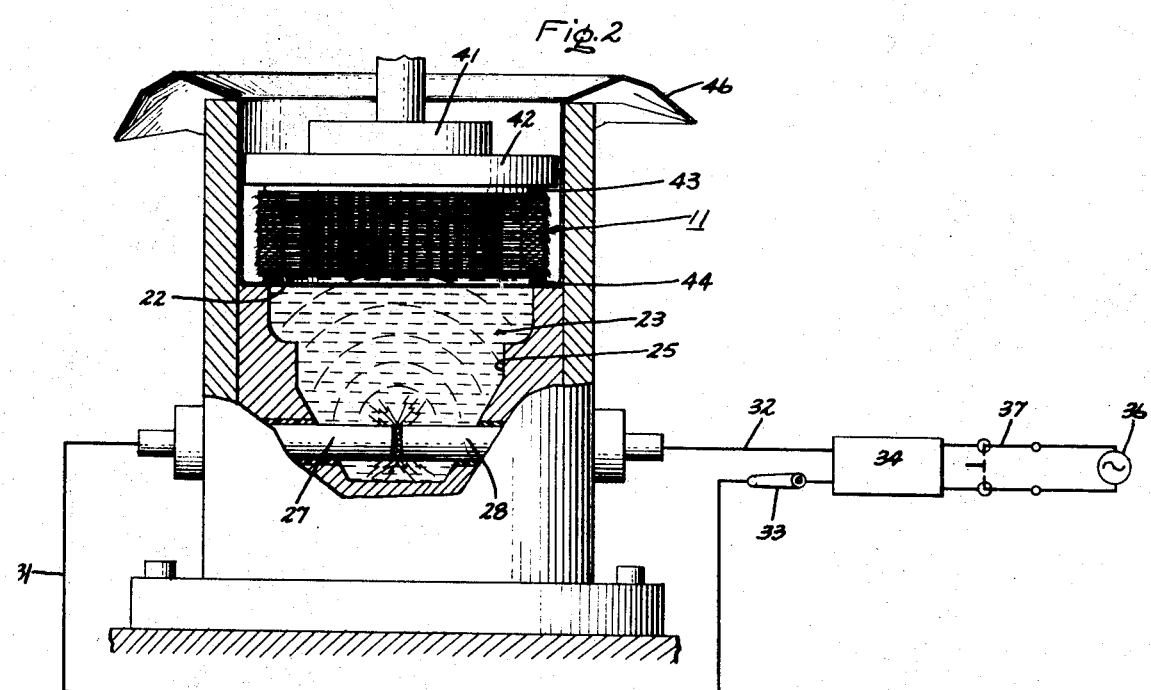
Inventor:
Harold R. Van Derzee,
by John F. Stoudt
Attorney.

Oct. 13, 1970  H. R. VAN DERZEE  3,533,867
METHODS FOR REDUCING ELECTRICAL LOSSES IN AND BONDING
OF ELECTRICAL INDUCTIVE LAMINATED STRUCTURES
Filed Jan. 13, 1967  3 Sheets-Sheet 2
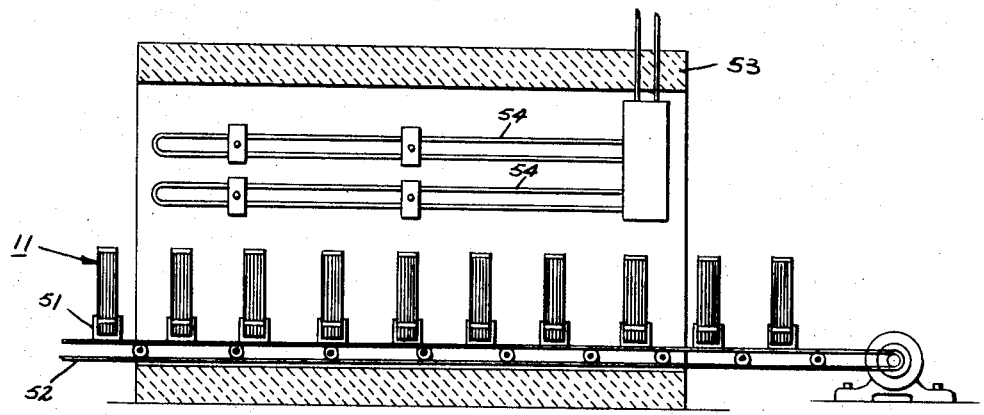
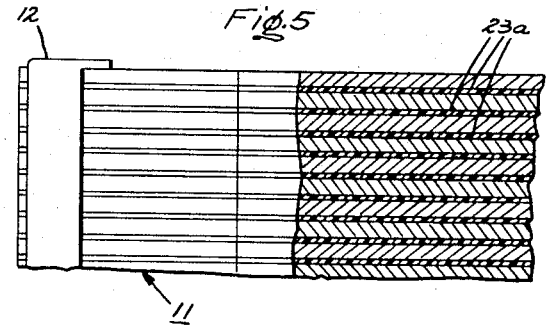
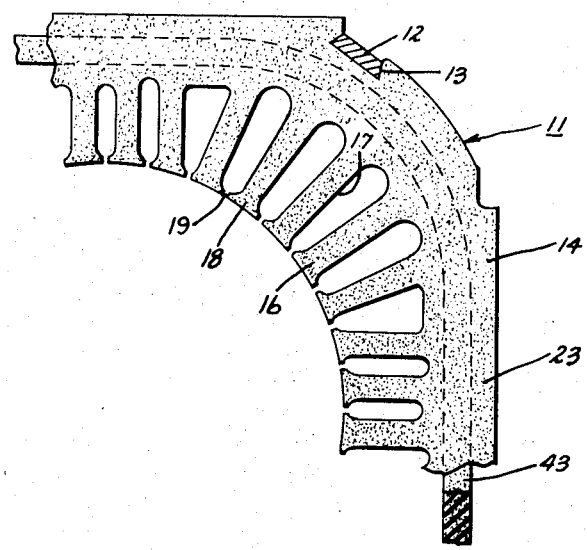
Inventor:
Harold R. Van Derzee,
by John M. Stoudt
Attorney.

Oct. 13, 1970 H. R. VAN DERZEE 3,533,867
METHODS FOR REDUCING ELECTRICAL LOSSES IN AND BONDING
OF ELECTRICAL INDUCTIVE LAMINATED STRUCTURES
Filed Jan. 13, 1967 3 Sheets-Sheet 3
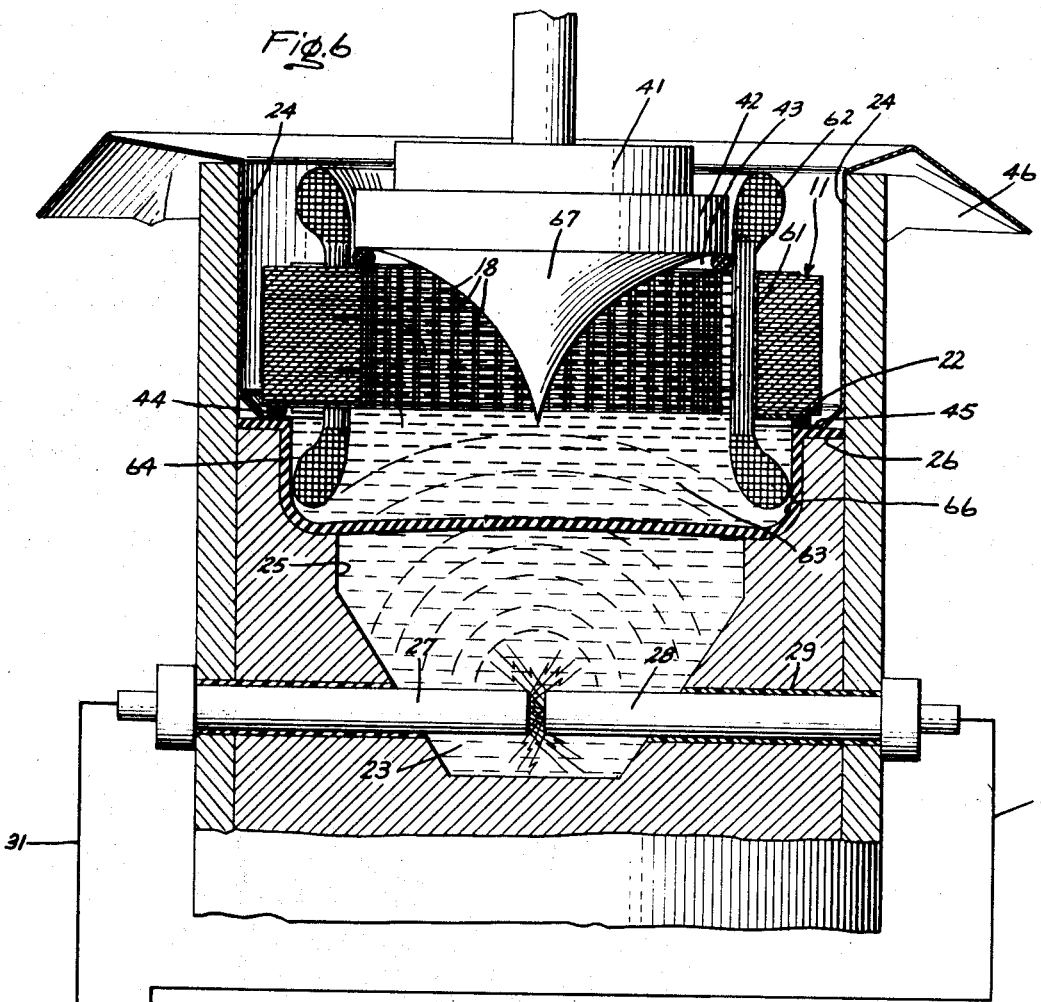
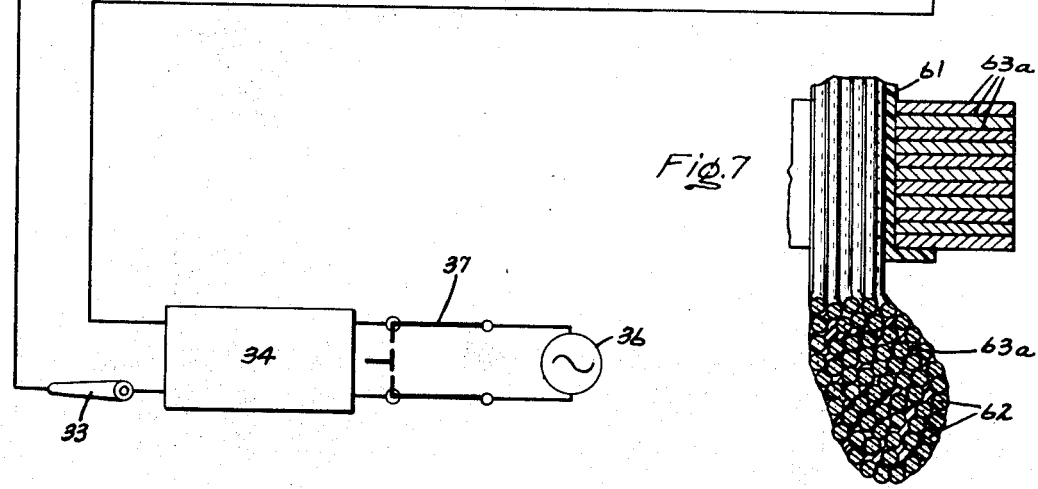
Inventor:
Harold R. Van Derzee,
by John M. Stoudt
Attorney.

United States Patent Office 3,533,867
Patented Oct. 13, 1970

3,533,867
METHODS FOR REDUCING ELECTRICAL LOSSES IN AND BONDING OF ELECTRICAL INDUCTIVE LAMINATED STRUCTURES
Harold R. Van Derzee, New Baltimore, N.Y., assignor to General Electric Company, a corporation of New York
Filed Jan. 13, 1967, Ser. No. 609,051
Int. Cl. H02k 1/22
U.S. Cl. 156—152    11 Claims

ABSTRACT OF THE DISCLOSURE

Metallic oxide or other bonds occurring between adjacent laminations in a stack of laminations, for example, laminated cores of inductive devices, may be destroyed by disposing the stack in proximity to a pressure transmitting medium. An electrical discharge wave is imparted to the medium which is then forced between the laminations to produce relative movement thereby breaking the bond. By using an adhesive fluid such as unhardened insulating material as the medium, the laminations may be subsequently secured together after the material is hardened.

BACKGROUND OF THE INVENTION

The present invention relates to improved methods for reducing electrical losses in electrical inductive laminated structures and more particularly to the reduction of electrical losses in laminated magnetic cores, especially suitable for use in dynamoelectric machines, transformers, and the like; to the bonding of the laminations together; and to the impregnation of electrical coils.

During the manufacture of laminated magnetic cores for electrical inductive devices, it is common practice to stamp out or otherwise punch out a number of relatively thin laminations into the desired configuration from suitable sheet material, such as steel, common iron or the like. With specific reference to dynamoelectric machine cores, each lamination includes a plurality of angularly spaced apart notches which define winding accommodating slots after a preselected number of laminations have been stacked in aligned relation and suitably secured together by mechanical means, such as welds, keys, and the like, to form a laminated magnetic core. Thereafter, the core may be annealed for stress relief purposes.

It is quite common for an interlaminate metallic bond to be formed in such cores between many, if not all, of the next adjacent laminations. The metallic bond may result from any one of a number of causes. It is believed that with respect to laminated cores which have been subjected to anneal after the laminations of the core have been secured together, the anneal produces oxides on the lamination surfaces facing one another. These oxides in turn join the next adjacent laminations together and create eddy currents, among other things, when the core is in operation to produce so-called "core losses," i.e., undesirable energy losses usually exhibited in the form of heat which adversely affects the output of the inductive device. In addition, for those applications, such as in hermetic motors, where it is desirable to augment the securement provided by the mechanical securing means by the provision of a thermo-responsive bond or layer between next adjacent laminations, the oxides tend to prevent the proper formation of this thermo-responsive bond.

Another problem associated with laminated cores is the retention of electrical coils, formed by a number of conductor turns compressed together into a contact mass, in a predetermined final position on the cores. One of the more widely accepted approaches attempts to impregnate the coils with suitable bonding material which acts as the means for holding the coils in the desired final position. Unfortunately, when the coils are in the final position, there has been a practical difficulty in penetrating the confines of the tightly compacted coil turns to a sufficient depth with the bonding material for attaining the desired bonding effect of the coil turns.

It is therefore a primary object of the present invention to provide an improved method for manufacturing inductive laminated structures, and especially a method for forcing a pressure transmitting medium between adjacent elements of the structure to effect the desired results. It is yet another and more specific object of the invention to provide such improved method which reduces electrical losses in the structure and also furnishes a laminated structure having next adjacent laminations bonded together into a unitary mass by suitable bonding material.

It is still another object of the invention to provide an improved and versatile method which is particularly effective in destroying interlaminate metallic oxide bonds existing between next adjacent laminations of a magnetic core for electrical inductive devices.

It is a further object of the present invention to provide an improved method of impregnating electrical coils for use in inductive devices with a thermoresponsive, pressure transmitting material which bonds the coil turns together. It is another object to provide such a method which is also capable of bonding the laminations together with the thermoresponsive material, as the bonding of the individual turns of the coils employed with the cores is attained.

SUMMARY OF THE INVENTION

In carrying out the present invention in one form, I provide an improved method for reducing electrical losses in electrical inductive laminated structures. By way of illustration, in a laminated magnetic core having a number of laminations secured together in stacked, face-to-face, adjacent relation, a metallic oxide bond may occur between next adjacent laminations. In order to destroy the oxide bond, the core is initially disposed in proximity to a pressure transmitting medium. For stator cores, it is convenient to fill at least the rotor receiving bore of the core with the material to provide the proximity. Thereafter, an electrical discharge wave is imparted to the medium which is then forced by the wave between next adjacent laminations. This action, in turn, produces relative movement of the laminations and destroys the oxide bond to reduce electrical losses in the core.

It is quite advantageous to employ an unhardened thermoresponsive adhesive insulating material in fluid form as the pressure transmitting medium so that it forms a relatively thin film between next adjacent lamination which, when subsequently hardened, bonds the laminations together and insulates the laminations, at least partially, one from the other.

By a further aspect of the present invention, an electrical coil for use in inductive strultures and formed by a number of adjacent conductor turns, may conveniently be impregnated with the same type of unhardened adhesive insulating material as employed for the pressure transmitting medium mentioned above. The coil to be impregnated is initially placed in contact with the adhesive insulating material and an electrical discharge wave also imparted to the material to force it into the interstices of the coil. Thereafter, the material is hardened and serves to secure the individual coil turns firmly together.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawings.

BRIEF DESCRIPTION OF THE DRAWINGS

In the drawings:

FIG. 1 is a partial elevational view, partly in section and partly in schematic diagram form, of electrohydraulic equipment and unhardened non-metallic bonding material for carrying out at least part of one form of the inventive method, with the illustrated magnetic laminated core being an annealed core in position preparatory to the performance of the present inventive method;

FIG. 2 is a view similar to the view of FIG. 1 revealing the equipment introducing the unhardened bonding material between next adjacent laminations of the core and destroying interlaminate bonds during the practice of a part of the one form of the invention;

FIG. 3 is a partial view, broken away in part, of a portion of the magnetic core of FIG. 2, to show a laminate surface of a core lamination covered with a relatively thin adherent layer of the unhardened bonding material;

FIG. 4 is an elevational view, partly in section, showing one way in which the adherent layer of bonding material between next adjacent laminations may be hardened;

FIG. 5 is a partial view, partly broken away, of a magnetic core fabricated by one form of the present method;

FIG. 6 is a partial elevational view, partly in section and partly in schematic diagram form, of electrohydraulic equipment carrying out a modified form of the present invention as applied to the magnetic core accommodating winding coils; and FIG. 7 is a partial view in cross-section of the core and a winding coil, shown in FIG. 6, subsequent to the performance of the modified form of the present invention.

DESCRIPTION OF THE PREFERRED EMBODIMENTS

Turning now to the drawings in more detail and in particular to FIGS. 1–5 inclusive, the first embodiment of the present invention is shown in connection with a laminated structure in the form of a stator core 11 especially adapted for use in fractional and small horsepower size dynamoelectric machines. The core is conventionally fabricated from a plurality of stacked laminations punched from suitable sheet material which are held together in a stacked relation by a plurality of keys 12 frictionally held in grooves 13 extending axially across the outer periphery of the stack. As is best seen in FIG. 3, the core has an outer yoke section 14 and a number of inwardly projecting teeth sections 16 which together form angularly spaced apart coil accommodating slots 17. The teeth sections terminate at their radially inner ends in enlarged lips 18 which define between adjacent lips entrances 19 to the slots and a central rotor receiving bore in the usual way. In the embodiment of FIGS. 1–5 inclusive, it will be assumed that core 11, prior to being acted upon by the present invention, has been annealed for stress relief purposes by any well-known annealing procedure. For example, the core may be annealed in a controlled and heated atmosphere of approximately 800° C. for a period of forty minutes. In addition, at the stage of its fabrication seen in FIG. 1, no so-called ground insulation or other electrical insulation means has been provided in the slots or on the end faces 21, 22 of the core.

In order to furnish the desired relative movement of the individual laminations in the exemplification, thereby reducing electrical losses such as might occur, for instance, from engagement of next adjacent lamination faces with interlaminate bonds resulting from the anneal, the core is initially positioned in communication with a pressure transmitting medium 23. In the illustrated embodiment, for best results the medium may be of generally incompressible fluid capable of transmitting shock or pressure waves. As seen in FIG. 1, core 11 is placed in an open-ended fluid impervious chamber 24 of any suitable pressure wave creating equipment, such as electrical discharge apparatus. The fluid impervious chamber has an annular shoulder or seat 26 adapted to hold end face 22 of the core for supporting the core in the chamber above lower part or medium reservoir 25 of the chamber (as viewed in the drawings) which incorporates pressure wave generating means.

More specifically, a pair of oppositely projecting electrode assemblies 27, 28 each have an electrically conductive element extending through oppositely facing walls of chamber 24 and being insulated therefrom by insulation 29. The electrode assemblies are electrically connected by leads 31, 32, and switch 33 across a suitable electrical energy surge supply 34 capable of furnishing an electrical energy surge to initiate and sustain an arc discharge in the gap between assemblies 27, 28 for producing an electrical discharge pressure or shock wave of the desired magnitude in medium 23. By way of example, source 34 may incorporate a bank of capacitors energized from an alternating current power source 36 through switch 37. One type of supply which may be employed is disclosed more fully in the co-pending patent application of Richard D. Gibbs and Raymond G. Rushing, Ser. No. 426,991, filed Jan. 21, 1965, now Pat. No. 3,421,209.

To direct pressure transmitting medium 23 into proper pressure engagement with the laminated core 11, it is desirable to have medium 23 in communication with selected regions of core 11 and to prevent escape of the medium at other locations. More specifically, in the exemplification the core is firmly retained on seat 26 to provide communication of the bore and slots with reservoir 25 by head 41, supported for movement into firm contact with the upper end face 21 of the core. Element 42 of the head extends across the slots and bore to seal any core opening at that location. Resilient gaskets 43, 44 such as rubber O-rings may be employed radially beyond the slots and bore on either side of the core to insure a sealed relation between yoke section 14 of the core and unit 41 on the one side and seat 26 on the other.

With the pressure transmitting medium in communication with the core bore and slots as seen in FIG. 2 and head 41 in the lower position applying a downwardly force axially in the core, an electrical discharge pressure wave is imparted to the medium such that the medium is rapidly driven or expanded radially outwardly between next adjacent laminations to cause relative movement of the laminations. However, unit 41 and the seal between that unit and the seat 26 prevent escape of the medium at those locations.

To provide the electrical energy necessary to initiate and sustain an arc discharge across electrodes 27, 28 capable of producing the desired movement of medium 23, switch 37 is closed in the exemplification and the capacitors in the energy surge supply 33 are charged to the desired voltage level. Thereafter, switch 37 is closed in the exemplification and the capacitors in the energy surge supply 33 are charged to the desired voltage level. Thereafter, switch 33 is closed so that the capacitors will discharge a spark between electrodes 27, 28 which, in turn, impart the electrical discharge pressure wave to medium 23. The medium is driven radially through the core, between next adjacent laminations thereby achieving relative movement of the laminations and effectively separates, at least temporarily, the laminations in locations other than at keys 12. It is believed that where liquid is employed as medium 23, such as water, and an electric arc occurs in the same medium which is then driven between the laminations, part of the liquid is changed to vapor or gas. Thus, the fluid medium entering between the next adjacent laminations is a mixture of gas and liquid. Fluid in the form of gas could also be used. Entrapped moisture in the core may readily be removed in a subsequent operation by applying heat to the core, for example, subjecting the core to elevated temperatures for a predetermined length of time, like 150° C. for four hours.

In any case, interlaminate bonds, such as oxides resulting from the anneal operation, which might tend to join next adjacent laminations together efficiently are destroyed by the portion of the fluid medium driven between the laminations. In this way, significant reductions in the electrical losses of the core are achieved with a corresponding reduction provided in energy losses in the form of heat from the core during subsequent operation thereof.

Medium 23 which travels entirely through the core is caught in chamber 24 radially beyond the core periphery, and if in liquid form, can be returned to reservoir 25 for reuse. The walls of the chamber beyond the arc are covered with material 46 to protect the chamber at that location.

The degree in reduction of electrical losses attained for a given application and lamination separation may be controlled by the magnitude of the pressure wave created in medium 23 as well as by the type of fluid employed as the medium. By the proper choice of medium 23, it is not only possible to attain the desired relative movement of next adjacent laminations, but also to introduce a film of insulating material between the laminations. For instance, a slurry or solution of insulating materials of fine granular size sufficiently small to penetrate between the laminations could be employed. The material will be forced between the laminations by the pressure wave imparted to medium 23 and deposited in the interlaminate spaces in the manner revealed in FIG. 3. Glass, flour, silica, and thermoresponsive insulating resins of fine granular size may be utilized for this purpose. It is believed that satisfactory penetration may be provided without distorting the individual laminations especially at the teeth sections beyond the point where the core becomes unsatisfactory, by using a solution having a Brookfield No. 1 viscosity at 4 r.p.m. less than 100 centipoises.

By employing unhardened thermo-responsive insulative high temperature adhesive or bonding material in solution, a thin coating may be applied to the slot walls and the core end faces inwardly of gaskets 43, 44 for insulation purposes. By way of illustration, such material may include a synthetic polyester resin of the type disclosed in U.S. Pat. No. 2,936,296 issued on May 10, 1960 to F. M. Precopio and P. W. Fox or an aqueous dispersed acrylic interpolymer resin of the kind revealed in Pat. No. 2,787,603 granted to P. F. Sanders on Apr. 2, 1957. Before the bonding material becomes hardened, it may be removed by wiping from those parts of the core where a coating is not desired, e.g., the bore and outer periphery.

The material deposited on the core, may be coalesced into a hardened or cured coating in any convenient manner, for example, by raising head 41, removing the core from chamber 24, and placing it into a fixture or holder 51 on a conveyor 52 for travel through an atmosphere of controlled heat as shown in FIG. 4. The conveyor transports the cores on the fixtures through a kiln 53 at a regulated rate of speed to apply the controlled amount of heat from heating elements 54 in the kiln 53. Of course, any means may be employed for the hardening step as, for example, by providing an adequate amount of hardener directly in the solution of medium 23 so that hardening may be accomplished at room temperature in a predetermined length of time. Therefore, kiln is shown merely by way of illustration. Once the material deposited on the core becomes hardened, it furnishes a hardened electrical insulating interlaminate layer, indicated at 23a in FIG. 5, and interlaminate bond which augments the securement provided by keys 12 in the exemplification. If desired, this bond could be employed as the only means for holding the stack of laminations together.

The following example is given to show more clearly how my invention as described above has been satisfactorily carried out in actual practice. The electrode gap was set at 7/16 inch, and supply 34 had a capacitor bank rated at 360 microfarads. The medium employed as 23 was a slurry or solution of unhardened aqueous dispersed acrylic interpolymer type resin. A number of cores were built with the following nominal dimensions:

| | |
|---|---|
| Corner-to-corner measurement _____ inches__ | 6.291 |
| Number of slots _____ | 36 |
| Pore diameter _____ inch__ | 3.488 |
| Lamination thickness _____ do__ | 0.025 |
| Axial stack length _____do__ | 1.0 |

The result achieved with my invention in two cores will be presented and are representative of the other cores tested and the benefits derived from one form of the invention.

After the two laminated cores were annealed at approximately 800° C. for forty minutes and had returned to ambient temperature conditions; i.e., 25° C., the electrical core losses were measured in accordance with the well-known "watt meter" or comparative watts test technique. Two torodial coils having different wire turns were wound through the bore and over the yoke sections, circumferentially around the core. The first coil was connected to the current coil of the watt meter and the second one to the potential coil of the same meter. Alternating current, passed through the first coil, produced magnetic flux in the coil which was sensed by the second coil to provide a reading on the watt meter, indicative of the electrical losses in the core under the test conditions. The two cores of the exemplifications had electrical losses of 53 and 56 watts respectively at 25 volts measured by this technique.

An electrical discharge pressure wave was imparted to medium 23 by initially charging the capacitor bank to a voltage level of 6,000 volts and thereafter discharging an electrical arc between electrodes 27 and 28. Medium 23, which initially filled reservoir 25, the bore and slots 17 of the core, was forced between next adjacent laminations and caused relative movement of the laminations in the stack, except in the region of keys 12. During this time a force of 4,000 p.s.i. on an area of 2.625 square inches (approximately 10,500 pounds) was maintained on the core. After the medium remaining in the stack was cured at a temperature of 200° C. for two hours, the electrical core losses were again measured at 25 volts by the watt meter test technique previously described and the electrical losses were reduced to 36 and 35.5 watts respectively.

The tested cores were satisfactory from the standpoint of electrical losses for the particular application. The material introduced between next adjacent laminations provided a satisfactory interlaminate film and the laminations were not separated to the extent that the core was distorted or that the teeth were bent axially away from the core. In addition, the securement provided by keys 12 was found to be augmented by the bond resulting from the interlaminate layers 23a.

In actual practice, it has been found that for a given energy input to medium 23, best results occur in the introduction of the medium between the laminations when the axis of the core and of the generated spark are approximately in co-axial alignment. Although medium 23 need not fill the slots 17 and bore of the core to obtain benefits from my invention, better results occurred both as to the amount of medium introduced between the laminations and the electrical core loss reduction, when this was done. In addition, for a given application, the energy level chosen should not be sufficiently high as to adversely affect the securement of the core, especially where bonding material is not used in solution for medium 23, nor of a magnitude which produces distortion of the laminations beyond the acceptable degree.

Turning now to the embodiment of the invention shown in FIGS. 6 and 7 in which like components are illustrated by like reference numerals to those employed in FIGS.

1–5 inclusive, the process of the present invention is carried forth on a laminated core already having ground insulation in the slots in the form of integral insulation 61 of the type disclosed in the N. Baciu Pat. No. 3,122,667. The slots also carry a plurality of electrical coils 62 formed on a number of turns of enameled wire, such as copper or aluminum. In the exemplification, the coils have already been pressed back approximately to the desired positions relative to the core, both in the slots as well as at the end turns, radially away from the bore. To close the upper side of the core, gasket 43 and element 42 are adapted to fit radially inward of the coils. In addition, the lower end turn portions of the coils extend into cavity 64 which is disposed directly over and is separated from the the fluid impervious reservoir 25.

In this embodiment, fluid impervious reservoir 25 contains one pressure transmitting medium 23 capable of having a spark discharged through it, while a second pressure transmitting medium 63 is arranged in the cavity 64, the bore and slots of the core as revealed in FIG. 6. The two mediums are separated by a fluid impervious flexible diaphragm member 66; e.g., fabricated of rubber 1/8 inch in thickness, which is capable of transmitting a pressure wave from the first medium to the second pressure transmitting medium. The diaphragm may be secured in place between reservoir 25 and cavity 64 by cement or the like (not shown).

With this arrangement, the second pressure transmitting medium 63 need not be of the type capable of supporting a discharge spark or arc. In operation, the pressure or shock wave of the desired magnitude is generated in medium 23 by electrodes 27, 28 and transmitted through diaphragm 66 to medium 63. This, in turn, causes the wave to be imparted to the second medium 63 which is then expanded into pressure engagement with the coil turns in the slots and with the lower end turn portions in cavity 64. As seen in the left side of FIG. 6, medium 63 will also be forced radially outwardly between next adjacent laminations primarily in the region of the teeth sections. Wave deflector member 67, having a generally concave-shaped outer surface, may be employed to assist in directing pressure waves to the desired locations of the core. This action not only tends to separate slightly the next adjacent laminations principally in the vicinity of the teeth sections, but also applies pressure against the coil side turn portions and lower end turn portions thereby obtaining a slight degree of additional press back when sufficient forces are produced.

If unhardened bonding material of the type already discussed in connection with the first embodiment is used in solution as medium 63, a partial film will be provided between the laminations primarily in the region of the teeth sections (63a in FIG. 7). In view of the coils located in the slots and insulation 61 covering the slot walls, the introduction of the material for a given energy input will not be as effective as in the case of the first embodiment. Thus, lamination movement, reduction in electrical core losses, and overall bonding strength attained will not be as dramatic for the core of the second embodiment. However, by the second embodiment, the unhardened bonding material may be forced into interstices of the coils in the slots and in at least the lower end turns to impregnate the coils. Once hardened, the material 63a (FIG. 7) will serve to retain the coils in position and will aid in heat transfer from the interior of the coils for dissipation thereof during subsequent coil excitation.

It will therefore be appreciated from the foregoing description that although in the illustrated exemplifications, the principles of my invention were applied to a laminated core for use in dynamoelectric machines, the invention can be advantageously carried out with laminated structures adapted for use in other electromagnetic devices and apparatus where it is desired to obtain a reduction in electrical losses, provide relative movement of laminations for one reason or another, and/or furnish a coating of material at a particular location in the laminated structure. In addition, the present invention is economically and efficiently capable of achieving the above mentioned desirable results, being extremely versatile in nature since it can be practiced with laminated structures of unusual configurations and still effectively attain the desired results. Thus, the present invention may readily be utilized in the fabrication of such laminated structures incorporated in transformers, rotors and others.

It should be apparent to those skilled in the art that while I have shown and described what at present is considered to be the preferred embodiments of my invention in accordance with the patent statutes, it is to be understood that modifications can be made without actually departing from the true spirit and scope of this invention and I therefore intend to cover in the following claims all such equivalent variations as fall within the invention.

What I claim as new and desire to secure by Letters Patent of the United States is:

1. A method of forcing a first pressure transmitting medium between adjacent laminations in a laminated magnetic core carrying at least one electrical coil having interstices, the method comprising the steps: arranging the core in proximity to a first pressure transmitting medium comprising unhardened bonding insulation material and disposing the coil in proximity to the insulation material; imparting a pressure wave to the unhardened bonding insulation material; forcing the unhardened bonding insulation material between adjacent laminations by the pressure wave whereby a reduction of electrical losses in the core may be effected, and forcing the unhardened bonding insulation material into the coil interstices and impregnating the coil therewith; and thereafter hardening the bonding insulation material in the coil interstices.

2. A method of impregnating at least one electrical coil formed of a number of conductor turns, with bonding insulation material, including the steps: arranging the coil in communication with a first pressure transmitting medium comprised of unhardened bonding insulation material; imparting an electrical discharge pressure wave to said medium and forcing the unhardened bonding material into interstices of the coil by virtue of the electrical discharge pressure wave; and hardening the bonding material thereby securing the individual turns firmly together.

3. The method of claim 2 in which the conductor turns include an insulating coating, the coil is carried by a magnetic core for use in an inductive device, the pressure transmitting medium is thermo-responsive, and the material is hardened by the application of heat below the temperature which adversely affects said insulating coating.

4. A method of manufacturing a laminated electrically inductive structure, formed by a number of elements held together in adjacent predetermined relation and obtaining relative movement of the elements, the method comprising the steps: positioning the elements in the vicinity of a generally incompressible pressure transmitting medium; imparting shock waves to said generally incompressible pressure transmitting medium; and driving the medium between next adjacent elements, as the elements are being held in the adjacent predetermined relation, by virtue of the shock waves to effect desired relative movement of said next adjacent elements.

5. A method of reducing electrical losses in a stator core having a plurality of coil accommodating slots and a bore formed by a number of magnetic laminations secured together in aligned, face to face adjacent relation, the method comprising the steps: disposing a first pressure transmitting fluid medium in at least the bore of said core in contact with next adjacent laminations; transmitting an electrical discharge pressure wave through said fluid medium; and forcing the medium between said next adjacent magnetic laminations as a result of the pressure wave to effect a desired reduction of electrical losses in the stator core.

6. The method of claim 5 in which said pressure transmitting medium is unhardened thermo-responsive insulating material and, after the medium has been forced between next adjacent laminations, the medium is hardened to bond the laminations together and to insulate the next adjacent laminations one from the other.

7. The method of claim 6 in which the electrical discharge pressure wave is created in a second pressure transmitting medium capable of receiving an electrical discharge and transferred to said unhardened thermo-responsive insulating material.

8. The method of claim 5 in which the stator core accommodates at least one electrical coil, formed by a number of conductor turns having interstices between some of said turns, and unhardened thermo-responsive insulating material is disposed in the vicinity of the coil when the first pressure transmitting fluid medium is disposed in at least the bore of said core; said unhardened material being forced into the coil interstices by an electrical discharge pressure wave transmitted to the material for impregnating the coil therewith; and said unhardened thereafter being hardened to bond said conductor turns firmly together in the vicinity of said interstices.

9. A method of reducing electrical losses in a laminated magnetic core for use in an inductive device and including a plurality of adjacent laminations, the method comprising the steps: arranging the core in proximity to a first pressure transmitting medium; imparting a pressure wave to said first pressure transmitting medium; and forcing said first pressure transmitting medium between adjacent laminations by the pressure wave to produce a reduction of electrical losses in the core.

10. The method of claim 9 in which said first pressure transmitting medium is unhardened thermo-responsive insulating fluid material and, after the medium has been forced between said adjacent laminations, the fluid material is hardened to bond the laminations together and to insulate said adjacent laminations one from the other.

11. The method of claim 9 in which the pressure wave is created in a second pressure transmitting fluid medium capable of receiving an electrical discharge and transferred to said first pressure transmitting medium.

References Cited

UNITED STATES PATENTS

| | | | |
|---|---|---|---|
| 2,623,920 | 9/1951 | Ford | 336—234 X |
| 3,149,372 | 9/1964 | Stinger | 18—5 |
| 3,045,133 | 7/1962 | Aske | 336—219 X |
| 3,222,626 | 12/1965 | Feinberg et al. | 336—219 X |

CARL D. QUARFORTH, Primary Examiner

S. HELLMAN, Assistant Examiner

U.S. Cl. X.R.

29—203, 239; 310—217; 336—219, 234